United States Patent Office 2,847,474
Patented Aug. 12, 1958

2,847,474
2-(4-BROMOPHENYL)-1,3-DIKETOHYDRINDENE

Louis Freedman, Mount Vernon, and Seymour L. Shapiro, Hastings on Hudson, N. Y., and Karl Geiger, Passaic, N. J., assignors to U. S. Vitamin Corporation, New York, N. Y., a corporation of New York No Drawing. Application March 5, 1954
Serial No. 414,512

1 Claim. (Cl. 260—590)

This invention relates to a new anticoagulant compound in the class of 2-substituted-1,3-diketohydrindenes.

The recognition by medical practitioners of the potential harm associated with blood clotting in vivo has created a need for safer and more efficient anticoagulant drugs than those now in use. The "ideal anticoagulant" should be a compound that will be effective when administered orally, be relatively non-toxic, give a predictable response in most patients, and have a rapid onset but a relatively short duration of action; and its effects should be reversible by vitamin K.

Recently, phenylindandione (2-phenyl-1,3-diketohydrindene) whose anticoagulant properties were reported by Jacques et al. (Canad. M. A. J. 62: 465, 1950) was introduced into clinical use. While this compound has certain advantages over the more active drug, Dicumarol (which is described at page 218 of New and Non Official Remedies, 1953), in that it has a more rapid onset of action, it fails to meet many of the requirements of the "ideal drug" referred to.

We have found that by substituting para-bromophenyl in the 2-position of the 1,3-diketohydrindene nucleus, we obtain a new compound which has many of the desirable anticoagulant properties and is superior to phenylindandione.

In addition to prevention or mitigration of the various thromboembolic diseases resulting from sudden and unnatural clotting of blood, our new anticoagulant is useful in pre- and post-surgical operations, in post-partum cases and for long-term therapy in ambulatory cases.

This unanticipated discovery is in striking contrast to the effect which might have been expected form observations reported up to this time in the literature relative to structural modifications of anticoagulant drugs. Thus Meunier et al. (Comptes Rendus 224: 1666, 1947) report that the presence of substituents in the phenyl ring reduces anticoagulant effect, as is the case in Dicumarol. Likewise Link (The Harvey Lecture Series, 39: 162, 1943-4) concluded that the addition of any groups to any part of the molecule leads to reduced anticoagulant activity.

The following example will serve to characterize and describe the method by which we have prepared our new anticoagulant.

EXAMPLE

*Preparation of 2-(4-bromophenyl)-1,3-diketohydrindene*

To a solution of 1.85 g. of sodium in 40 ml. of ethanol, was added 10 g. of phthalide and 14.0 g. of p-bromobenzaldehyde, and the reaction mixture was heated on the steam bath for one hour. Water was then added, and the alcohol was distilled off. Then after adding additional water, the reaction mixture was acidified with hydrochloric acid to precipitate the crude product, which was filtered off, dried and recrystallized from methanol.

*Analysis.*—Calcd. for $C_{15}H_9O_2Br$: C, 59.83; H, 3.01. Found: C, 60.00; H, 3.22.

The product is in the form of dark red crystals, having a melting point of 133–135° C.

Our new anticoagulant fulfills most of the requirements of the "ideal anticoagulant." It has a low toxicity and is active in lower doses than the anticoagulants previously described. By comparison, the decrease in pro-thrombin time, which is directly proportional to increase in anticoagulant effect, of our compound is many times that of phenylindandione. Also of importance is the fact that the hypoprothrombinemic pattern of our compound can be effectively reversed by vitamin $K_1$.

While we do not have any proven theory to explain the increased anticoagulant activity of our new anticoagulant, it is believed that it may exist to a greater extent in its enol form at the pH of body fluids, as shown in the following structural relation.

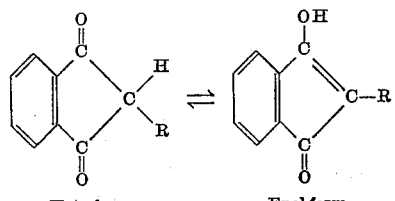

Keto form      Enol form where R represents 4-bromophenyl.

Having described our invention, what we claim is:
The compound 2-(4-bromophenyl)-1,3-diketohydrindene.

References Cited in the file of this patent
UNITED STATES PATENTS 2,672,483     Thomas _____ Mar. 16, 1954

OTHER REFERENCES

Nathanson, F.: Ber. Deut. Chem. 26, 2576 (1893).
Dieckmann: Ber. Deut. Chem. 47, p. 1439 (1914).
Koelsch: J. Am. Chem. Soc. 58, pp. 1329, 1331-3 (1936).
Burger, A.: Medicinal Chemistry, vol. I, p. 264 (1951).